…

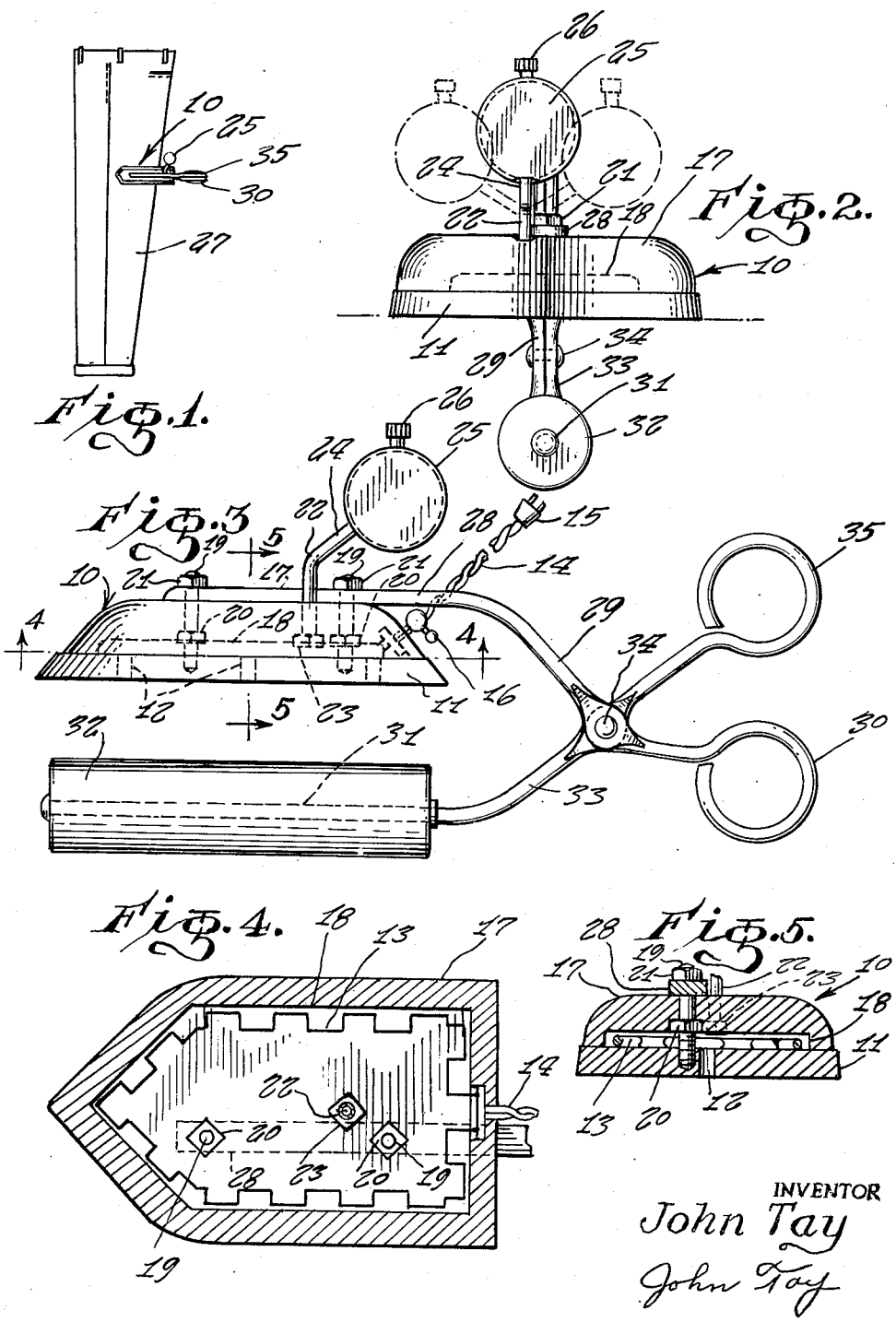

United States Patent Office 2,807,896
Patented Oct. 1, 1957

2,807,896

STEAM PRESSER ROLLER

John Tay, St. Petersburg, Fla.

Application June 11, 1956, Serial No. 590,550

2 Claims. (Cl. 38—77)

This invention relates to steam pressing devices.

It is an object of the present invention to provide a steam roller presser which is electrically and hand operated, is of simple, light construction and can freshen and take out wrinkles from garments and trousers in a matter of minutes.

It is another object of the present invention to provide a steam presser roller of the above type which eliminates bulky equipment, such as an ironing board, and which carries its own roller and which will provide steam, if desired.

It is still another object of the present invention to provide a steam presser roller of the above type which can also be used by a simple attachment as a conventional iron.

For other objects and for a better understanding of the invention, reference may be had to the following detailed description taken in connection with the accompanying drawing, in which:

Figure 1 is a top plan view of a preferred embodiment of the present invention shown in operative use;

Fig. 2 is an end elevational view thereof looking from the left of Fig. 1;

Fig. 3 is a side elevational view of the invention; and

Fig. 4 is a horizontal sectional view taken along the line 4—4 of Fig. 3; and

Fig. 5 is a vertical sectional view taken along the line 5—5 of Fig. 3.

Referring now more in detail to the drawing, 10 indicates generally a steam foot having the base plate 11, the latter being provided with the longitudinally spaced openings 12.

An electric heating element 13 is superimposed on the base plate 11 on the upper surface thereof and is connected to a household source of power by means of the electrical cord 14 and male plug 15, a switch 16 being mounted on the cover 17 at one end (Fig. 3). The cover 17 (Fig. 4) is provided on the undersurface thereof with the recess 18 which encloses the heating element 13 and provides a steam runway.

The cover 17 is secured to the base plate 11 by means of a pair of longitudinally spaced studs 19, the lower ends of which are screw threaded into the base plate 11 and extend upwardly through vertically aligned openings provided in the cover 17. Nuts 20 are recessed in the undersurface of the cover 17 and are in threaded engagement with the studs 19. Second nuts 21 are screwed onto the upper ends of the studs 19 and serve to retain the cover 17 against upward displacement.

A vertical swivel tube 22 extends downwardly through the cover 17 and is rotatably mounted about a vertical axis by means of the recessed nut 23, the upper end of the tube being bent upwardly and outwardly at an obtuse angle, as at 24 and fixedly mounting a hollow spherical reservoir 25 having a filler cap 26. The lower end of the tube 22 is flared inwardly to provide a narrow orifice and adapted to permit the water in the reservoir 25 to be dropped slowly onto the bottom plate 11, which latter when heated by the heating element 13 will transform the water into steam which will then escape through the outlets 12 onto the garment 27 being pressed.

A horizontal jaw 28 is provided with mounting openings which receive upwardly therethrough the studs 19 and is secured to the cover by means of the nuts 21, the jaw 28 extending beyond the steam foot in the downwardly and outwardly extending handle portion 29 which terminates in the finger grip or loop 30.

A second horizontal arm or jaw 31 is provided and rotatably mounts thereon the roller 32 adapted to cooperate with the bottom plate 11 whereby to receive the garment therebetween, the other end of the jaw 31 being formed with the upwardly and outwardly bent portion 33 pivotally connected to the handle 29 by means of the pin 34 and terminating in the second finger grip or loop 35 whereby, upon drawing the loops 30 and 35 together, the garment will be firmly engaged between the roller 32 and the base plate 11.

The jaw 28 may be removed from the steam foot by removing the nuts 21, to be replaced by a U-shaped handle, not shown, having similar mounting openings whereby to convert the steam foot into a conventional iron.

In operation, the base plate 11 is allowed to heat for a minute by turning on the switch 16, while filling the reservoir 25 with water. The water will drop onto the hot base 11 of the steam foot and generate steam. The steam will travel along the steam runway 18 and out of the openings 12. When pressing in a vertical direction, the reservoir 25 may be moved through ninety degrees to either side to keep the water level, as will be obvious. The pants or garment 27 is then placed between the roller and steam foot and grips 30 and 35 are squeezed, whereupon the presser is guided from the top to the bottom, as shown in Fig. 1. The material is steamed and then pressed dry by the heat of the presser in one operation. For dry pressing material, requiring lower heat, allow the presser to heat for a while and then disconnect the cord. The filler cap 26 is also provided with a vent opening to admit air.

While various changes may be made in the detail construction, it shall be understood that such changes shall be within the spirit and scope of the present invention as defined by the appended claims.

What I claim as new and desire to protect by Letters Patent of the United States is:

1. In a device of the kind described, a steam iron having a flat presser plate, a cover member provided with a steam chamber and fixedly mounted on the presser plate, a water supply tube having a lower section extending through the upper part of the cover member perpendicularly to the face of the presser plate and opening into the steam chamber, said lower section being rotatably mounted in the cover member, said supply tube having an upper section extending at an obtuse angle from the upper end of the lower section, a water supply receptacle fixed to the upper end of the supply tube and communicating therewith, a pair of tong-like jaws each having a forwardly extending arm, means fixedly securing one of said arms to the cover member, the other of said arms being circular in cross-section and having a presser sleeve rotatably mounted thereon, and a pivot connecting said jaws intermediate their ends.

2. The device of claim 1 wherein the pivot permits swinging of the presser roll and its mounting toward and from the presser plate in a plane perpendicular to the presser plate and including the longitudinal axis thereof.

References Cited in the file of this patent

UNITED STATES PATENTS

| 1,192,518 | Hammond | July 25, 1916 |
|---|---|---|
| 1,473,764 | Guesmer | Nov. 13, 1923 |
| 2,748,511 | Pezza | June 5, 1956 |
| 2,763,075 | Vance | Sept. 18, 1956 |